Figure 1:
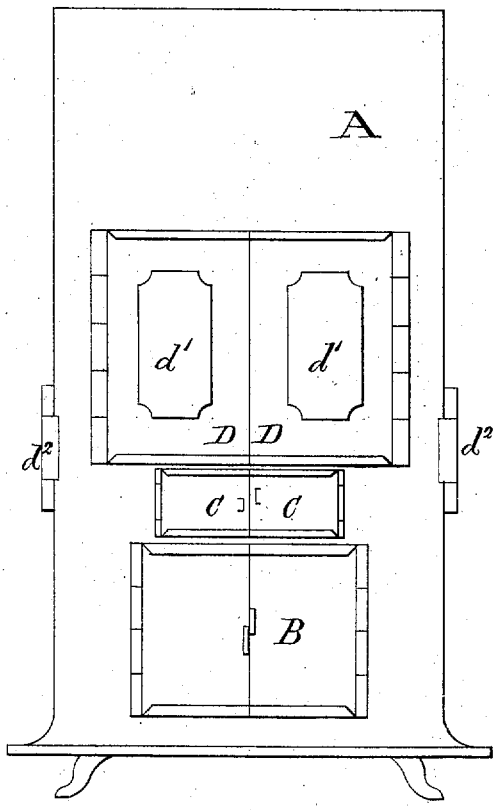

2 Sheets--Sheet 1.

J. SPEAR.

Base-Burning Stoves.

No. 6,206. Reissued Jan. 5, 1875.

Witnesses { Park M. Farland, Jr.
John F. Grant

James Spear
per Edw. T. Brown
attorney

N. PETERS, PHOTO-LITHOGRAPHER, WASHINGTON, D. C.

2 Sheets--Sheet 2.

J. SPEAR.

Base-Burning Stoves.

No. 6,206. Reissued Jan. 5, 1875.

Witnesses { Chas. W. Farland, Jr.
John F. Grant

James Spear
per Edw. Brown
attorney

N. PETERS, PHOTO-LITHOGRAPHER, WASHINGTON, D. C.

UNITED STATES PATENT OFFICE.

JAMES SPEAR, OF PHILADELPHIA, PENNSYLVANIA.

IMPROVEMENT IN BASE-BURNING STOVES.

Specification forming part of Letters Patent No. 100,335, dated March 1, 1870; reissue No. 5,459, dated June 17, 1873; reissue No. 6,206, dated January 5, 1875; application filed December 3, 1874.

DIVISION A.

*To all whom it may concern:*

Be it known that I, JAMES SPEAR, of 1016 Market street, Philadelphia, State of Pennsylvania, have invented certain Improvements in Stoves and Heaters, of which the following is a specification:

My invention relates to that class of stoves known as "base-burners;" and the particular features of my invention relate principally to the construction, combination, and working of the grate-surface or fire-bed in relation to the slate and clinker discharge end of the fire-chamber and the air-chamber inclosing them, to effect the discharge of slate and clinkers into the ash-pit of the stove, through an annular opening formed between the outer periphery of the grate-surface and the slate and clinker discharge end of the fire-chamber, by means of a poker inserted through clinker-cleaning openings in the wall of the stove, and thereby to maintain a grate-surface free from draft-obstructing materials.

The nature of my invention I will first briefly describe.

The grate-surface I make with a vibrating and dumping grate, which will turn or dump inside of the clinker-discharge end of the fire-chamber, and surround it with a ring. This ring, which is best known to the trade as a grate-rest or grate-bed, when placed in contact with the bottom of the fire-pot, I support below the slate and clinker discharge end of the fire-chamber a distance sufficient to form a vertical clinker-cleaning opening for the removal of slate and clinkers outwardly over the surface of the ring, and also between the periphery of the ring and wall of the stove into the ash-pit beneath. The ring in this position forms part of the grate-surface or fire-bed, and, by projecting its outer edge beyond the inside diameter of the clinker-discharge end of the fire-chamber, the coals and cinders are prevented from falling out too easily when the fire is kindled. Either the grate or ring can be shaken, separately or together, to free the surface from dust or ashes. Mica lights in doors are placed around the clinker-cleaning opening above the ring, and there is also a clinker-cleaning door in front.

In the arrangement of the opening for the removal of slate and clinkers from the grate-surface I afford better access thereto by suspending the lower section of the fire-chamber, so that its clinker-discharge end is on a line or plane below the top of the air-chamber immediately surrounding it. I also make the lower portion of the fire-chamber open or illuminating, and place mica windows in doors opposite the illuminating portion of it, above the clinker-cleaning doors, by which improvements the state of the fire at the discharge end of the fire-chamber is always visible, the amount of draft-obstructing material on the fire-bed can be easily detected, and any part of the grate-surface readily freed from draft-obstructing material.

To this end my invention consists in the combination of a grate-ring, forming a part of the grate-surface or fire-bed, and an intervening vertical clinker-cleaning opening between the ring and fire-chamber; also, in the combination of a grate-ring so arranged and a vibrating or dumping grate inside; also, in supporting the said grate-ring, arranged as described, from the wall of the stove; also, in the combination of a grate-surface or fire-bed capable of a horizontally-vibrating motion, and of larger diameter than the inside of the slate and clinker discharge end of the fire-chamber, or receptacle to contain the ignited fuel and refuse therefrom, and a clinker-cleaning opening between the grate-surface and the said discharge end; also, in making the lower section of the fire-chamber illuminating, and its discharge end projecting downward within the air-chamber, in combination with a clinker-cleaning opening above a broad projecting grate-surface or fire-bed; also, in the combination of the clinker-cleaning opening and mica lights in doors, or mica lights and separate clinker-cleaning doors around the opening; also, the combination of doors around the clinker-cleaning opening and mica lights above the doors and around the illuminating section of the fire-chamber; also, in combining a fire-chamber projected downward, and narrowed or contracted at its clinker-discharge end, a grate-ring, and a clinker-cleaning opening above the ring; the said arrangement and combination of parts affording greater facility for kindling the fire, regulating the state of the fire, and freeing the grate-surface or fire-bed from obstructions than any heretofore devised.

To enable others skilled in the art to make and use my invention, I will now proceed to describe its construction and operation, reference being had to the accompanying drawings, of which—

Figure 2:
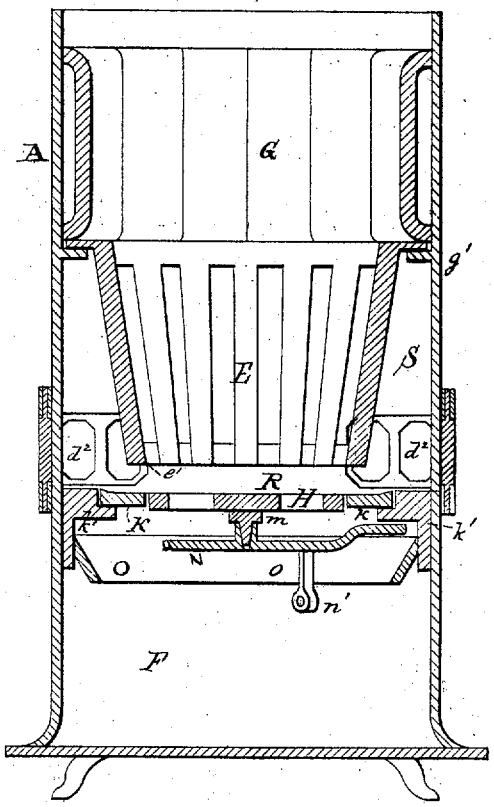
Figure 3:
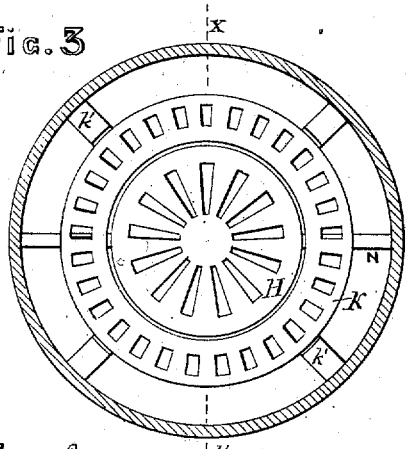
Figure 4:
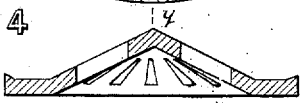
Figure 5:
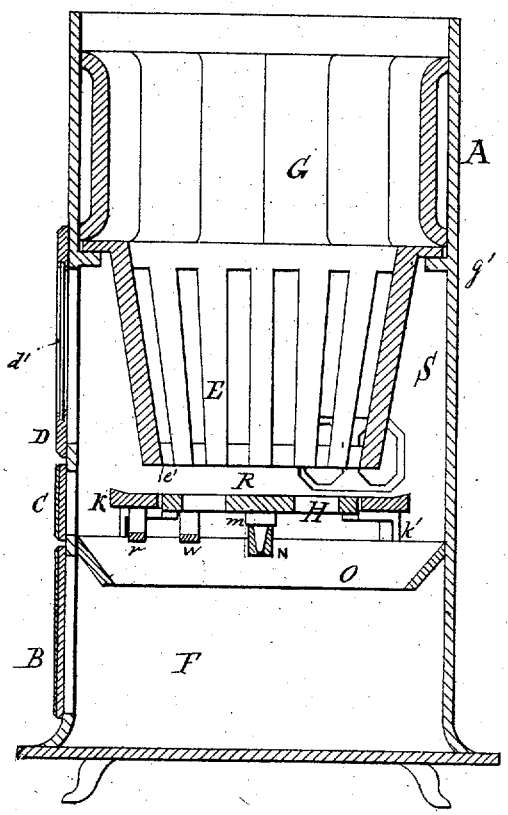

Figure 1 is an elevation of the outside body. Fig. 2 is a section through the stove on a line with the lugs $k'$. Fig. 3 is a plan of the grate-surface, showing also the space between the periphery and the wall of the stove. Fig. 4 is a transverse section through the grate, showing a raised center. Fig. 5 is a sectional elevation through the stove on the line X Y between the lugs $k'$.

A is the outside body or casing of the stove. This casing or wall of the stove joins the fire-chamber at the point $g'$ on a line above the discharge end of the fire-chamber, and is fitted in close contact with it, so as to exclude the air for combustion, which enters the ash pit through the door B, from passing upward, except through the grate H, the opening R, or the grated fire-chamber. The air-chamber S thus formed above the grate-surface is in full communication with the ash-pit through the annular space around the periphery of the grate-surface.

In my invention I suspend the basket-grate E by a ring at its upper edge, and project the clinker-discharge end thereof downward into the air-chamber S, to afford more vertical height in the wall of the air-chamber for the arrangement of mica lights and doors above the grate, and by which a better access is obtained for manipulating with a poker in the removal of slate and clinkers; also, by making the part E grated or illuminating, I can at any time see the amount of refuse matter standing in the fire-chamber, and discharge it as frequently as may be desired, and regulate the state of the fire with great exactness.

C are doors in the wall of the stove, partly above and partly below the periphery of the grate-surface, through which the bar is inserted for shaking the grate, and also for operating upon the clinkers. D are doors with mica-windows $d^1$, through which the fire may be seen in the basket-grate E, and also to enable the operator to direct his movements while removing the clinkers by shaking the grate, or by inserting the poker through the doors C.

In Fig. 2 are seen two pairs of smaller doors with mica lights in them, serving the double purpose of observing the state of the fire and for operating upon the clinkers by means of a poker inserted through them when opened. Should the fire stick in the grated section E, or clinkers stick in the grate, the large doors D or the small ones C, or mica doors $d^2$ are opened, and the fire and clinkers operated upon by a poker inserted for that purpose.

Above the basket-grate E is the fire-brick pot G. These two form what I term the fire-chamber; and the point $e'$, where the slate and clinkers would naturally leave the fire-chamber as they fall from it, I term the inside diameter of the slate and clinker discharge end of the fire-chamber.

The coals are fed to the fire by a door above, or by a reservoir, as is customary with stoves at present in use, and as described in my patent dated July 7, 1868, No. 79,696.

Instead of making the lower section E of the fire-chamber cylindrical, I make its clinker-discharge end smaller in diameter than the fire-pot G, so that I can use a broad projecting grate-surface without enlarging the air-chamber S to the extent that would be necessary were the fire-chamber of the same diameter throughout.

Beneath the basket-grate E is placed the grate H, altogether clear from it, at a distance of two or three inches, the distance varying according to the size of the coal and diameter of the grate. Outside of this grate is a circular ring, K, forming a part of the grate-surface or fire-bed. It is supported on four guides, $k'$, secured to the casing, and is free to rotate within them. This ring is somewhat larger than the inside of the lower mouth of the fire-chamber, and is curved a little upward at the edge, so that the coals and cinders are banked up, and thereby prevented from being shoved off too easily by the weight of the coals above. Inside this ring is a circular grate, H, having openings for air, and turning on a pivot, $m$, resting on the cross-bar N, which is pivoted to the sides of the base or ash pit, and by means of the arm $n'$ the grate H may be dumped. This rotating and dumping movement has been fully described in my previous patent. The ring K is shaken by a bar or rod passed through the doors C into the eye $r$ attached to the ring. The grate H is shaken in a similar manner by means of the eye W fastened to it; or the bar can be inserted through both eyes, so as to shake both together. The periphery of the grate-surface is at such a distance from the wall of the base that the clinkers and slate may fall therefrom over its periphery into the pan placed within the base, the necessary direction being given to them by the deflector O. (See Figs. 2 and 5.) The draft passes to the fire through the grate H, and also through the circular space R.

In a stove constructed in this manner I have the advantage of seeing at all times the exact state of the fire, and of regulating its intensity with very little trouble. All the slate and clinkers can easily be removed above the grate, and from any part of the grate-surface, and the fire kept up continuously. If, however, the fire be suffered to die out, the cinders can be dumped in the usual manner.

It is evident that the grate H and ring K may be cast in one piece, as shown in Fig. 4, so as to shake together, in which case all the slate, clinkers, and ashes would be removed through the opening R, and the fire continuously kept up, as before described.

It is also evident that the grate herein described can be used with a fire-chamber that is not open or grated so far as partially to secure the advantages accruing from the discharge of clinkers over the periphery of the grate-surface; but, with an illuminating fire-chamber and mica doors around it, I have the additional advantage of seeing at any time the height to which any dead refuse matter may extend into the fire-chamber.

I am aware that clinkers have been drawn through a hole in the front of a vertical basket-grate, as in the patent to J. Morrison, February 21, 1865, and that a grate inclosed by a ring has been common, the said ring forming a grate-rest, and being placed in contact with the fire-pot; also, that a sunken grate with an elevated ring, and a clinker-cleaning space between the said ring and grate, as shown in patent to C. Fulton, April 27, 1869, has been used; but such construction of clinker-cleaning grates differs in many essential particulars from the invention herein described.

I claim—

1. The combination of a receptacle or chamber to contain the ignited fuel and refuse therefrom, a horizontally-vibrating grate-surface or fire-bed of larger diameter than the inside of the clinker-discharge end of the said chamber, and the clinker-cleaning opening R, to admit a poker to clean the upper surface of the grate, substantially as herein described.

2. The combination of a fire-chamber, a grate-surface or fire-bed, consisting of a dumping-grate, H, and a surrounding ring, K, and a clinker-cleaning opening, R, above the ring, substantially as herein described.

3. The combination of a fire-chamber, the ring K, forming part of the grate-surface or fire-bed, and the clinker-cleaning opening R, above the ring, substantially as herein described.

4. The combination of a fire-chamber having its clinker-discharge end E grated or illuminating and projecting downward within the air-chamber S, a grate-surface or fire-bed projecting beyond the inside diameter of the slate and clinker discharge end of the fire-chamber, and the clinker-cleaning opening R, substantially as herein described.

5. The combination of a fire-chamber having its clinker-discharge end projecting downward within the air-chamber S, a grate-surface or fire-bed consisting of a dumping-grate, H, and a surrounding ring, K, and the clinker-cleaning opening, R, above the ring, substantially as herein described.

6. The combination of the vertical clinker-cleaning opening R and mica lights $d^2$, in doors opposite the opening, substantially as herein described.

7. The combination of the vertical clinker-cleaning opening R, mica lights $d^2$, and clinker-cleaning doors C, opposite the opening, substantially as herein described.

8. The combination of a fire-chamber, the clinker-cleaning opening R, between the fire-chamber and grate-surface, clinker-cleaning doors C, opposite the said opening, and mica lights $d^1$, opposite the illuminating-section E of the fire-chamber, substantially as described.

9. The combination of a fire-chamber and a grate-surface or fire-bed, which is supported from the wall of a stove, on a plane below the clinker-cleaning opening R, by means of lugs $k^1$ and cross-bar N, substantially as herein described.

10. The combination of a fire-chamber and a grate-ring, K, supported from the wall of the stove, on a plane below the clinker-cleaning opening R, by means of lugs $k^1$, substantially as herein described.

11. The combination of a fire-chamber having its discharge-end E illuminating, the grate-ring K, and the clinker-cleaning opening R, above the ring, substantially as herein described.

12. The combination of a fire-chamber having its slate and clinker discharge end contracted and projecting downward, a grate-ring, K, and a clinker-cleaning opening, R, above the ring, substantially as herein described.

JAMES SPEAR.

Witnesses:
EDWARD BROWN,
JOHN F. GRANT.